United States Patent
Shimamoto et al.

(10) Patent No.: US 10,447,886 B2
(45) Date of Patent: Oct. 15, 2019

(54) IMAGE PROCESSING APPARATUS FOR UPDATING A NON-VOLATILE MEMORY AND METHOD CONTROLLING IMAGE PROCESSING APPARATUS

(71) Applicant: KYOCERA Document Solutions Inc., Osaka (JP)

(72) Inventors: Kunihiko Shimamoto, Osaka (JP); Shinichi Hashimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 56 days.

(21) Appl. No.: 15/808,232

(22) Filed: Nov. 9, 2017

(65) Prior Publication Data

US 2018/0160006 A1   Jun. 7, 2018

(30) Foreign Application Priority Data

Dec. 5, 2016 (JP) ................................. 2016-235884

(51) Int. Cl.
| | |
|---|---|
| G06F 12/00 | (2006.01) |
| H04N 1/21 | (2006.01) |
| G06F 12/06 | (2006.01) |
| G06F 12/02 | (2006.01) |
| G06F 3/06 | (2006.01) |

(52) U.S. Cl.
CPC .......... *H04N 1/2166* (2013.01); *G06F 3/065* (2013.01); *G06F 3/0607* (2013.01); *G06F 3/0685* (2013.01); *G06F 12/0238* (2013.01); *G06F 12/0638* (2013.01); *G06F 2212/205* (2013.01); *H04N 2201/0094* (2013.01)

(58) Field of Classification Search
None
See application file for complete search history.

(56) References Cited

U.S. PATENT DOCUMENTS

2005/0055595 A1*  3/2005  Frazer ..................... G06F 8/665
                                                                 713/400

FOREIGN PATENT DOCUMENTS

JP        2010-92324 A      4/2010

* cited by examiner

*Primary Examiner* — Daniel D Tsui
(74) *Attorney, Agent, or Firm* — Stein IP, LLC

(57) ABSTRACT

An image processing apparatus has a nonvolatile memory including a first region and a second region, a control circuit, and a data input unit. First software is used for updating. Second software is not used for updating. When a starting condition for updating is satisfied, the control circuit overwrites the second region with the first software and makes the second region a new first region. Then, the control circuit overwrites the old first region with the second software and makes the old first region a new second region.

7 Claims, 8 Drawing Sheets

IMAGE PROCESSING APPARATUS FOR UPDATING A NON-VOLATILE MEMORY AND METHOD CONTROLLING IMAGE PROCESSING APPARATUS

INCORPORATION BY REFERENCE

This application is based upon and claims the benefit of priority from the corresponding Japanese Patent Application No. 2016-235884 filed on Dec. 5, 2016, the entire contents of which are incorporated herein by reference.

BACKGROUND

The present invention relates to an image processing apparatus that can perform the updating of a nonvolatile memory.

Appliances and devices often incorporate a nonvolatile memory. The nonvolatile memory stores software and the like. Appliances and devices operate based on the software in the nonvolatile memory. For additional functions and improved stability, the software in the nonvolatile memory is sometimes updated (renewed).

A known technology related to the updating of a nonvolatile memory is as follows. In a known broadcast reception apparatus, a recovery program and an updating program are received, and the programs are stored. With the updating program, the updating of software is performed. In a case where a recovery program and an updating program are received, while the recovery program is written in to a predetermined region, the updating program is written in to a region other than the predetermined region. When the writing-in of the updating program succeeds, the predetermined region is overwritten with the updating program; When the writing-in of the updating program fails, the recovery program written in the predetermined region is executed.

Image processing apparatuses (image forming apparatuses) such as multifunction peripherals, printers, copiers, and facsimile machines also incorporate a nonvolatile memory. The stored contents of the nonvolatile memory comprise software, programs, data, files, and the like. In an image processing apparatus, software or the like in the nonvolatile memory is sometimes updated (rewritten). However, during updating, the supply of electric power may stop (the electric power may fail). The supply of electric power can stop due to power outage, power cable disconnection, and the like.

When the supply of electric power stops, updating is terminated forcibly (terminates abnormally). Updating thus fails. An abnormal termination may damage part of the essential software that is used for starting-up and updating. In that case, when the image processing apparatus is started up or updating is performed all over again after an abnormal termination, the image processing apparatus fails to operate. Thus, an abnormal termination can make the image processing apparatus unusable.

SUMMARY

According to the present disclosure, an image processing apparatus includes a nonvolatile memory, a control circuit, and a data input unit. The nonvolatile memory is provided with a plurality of regions by partitioning. The nonvolatile memory includes a first region which is one of the regions and which stores previously determined first software and a second region which is one of the regions and which stores previously determined second software. The control circuit controls the nonvolatile memory. The data input unit acquires updating information of the nonvolatile memory. The first software is used for the updating of the nonvolatile memory. The second software is not used for the updating of the nonvolatile memory. When a previously determined starting condition for the updating is satisfied, the control circuit makes the nonvolatile memory perform first overwriting processing whereby, based on the updating information acquired by the data input unit, the second region is overwritten with the first software and the second region is made a new first region. After the first overwriting processing is complete, the control circuit makes the nonvolatile memory perform second overwriting processing whereby, based on the updating information acquired by the data input unit, the old first region is overwritten with the second software and the old first region is made a new second region.

Further features and advantages of the present disclosure will become apparent from the description of embodiments given below.

DETAILED DESCRIPTION

Figure 1:
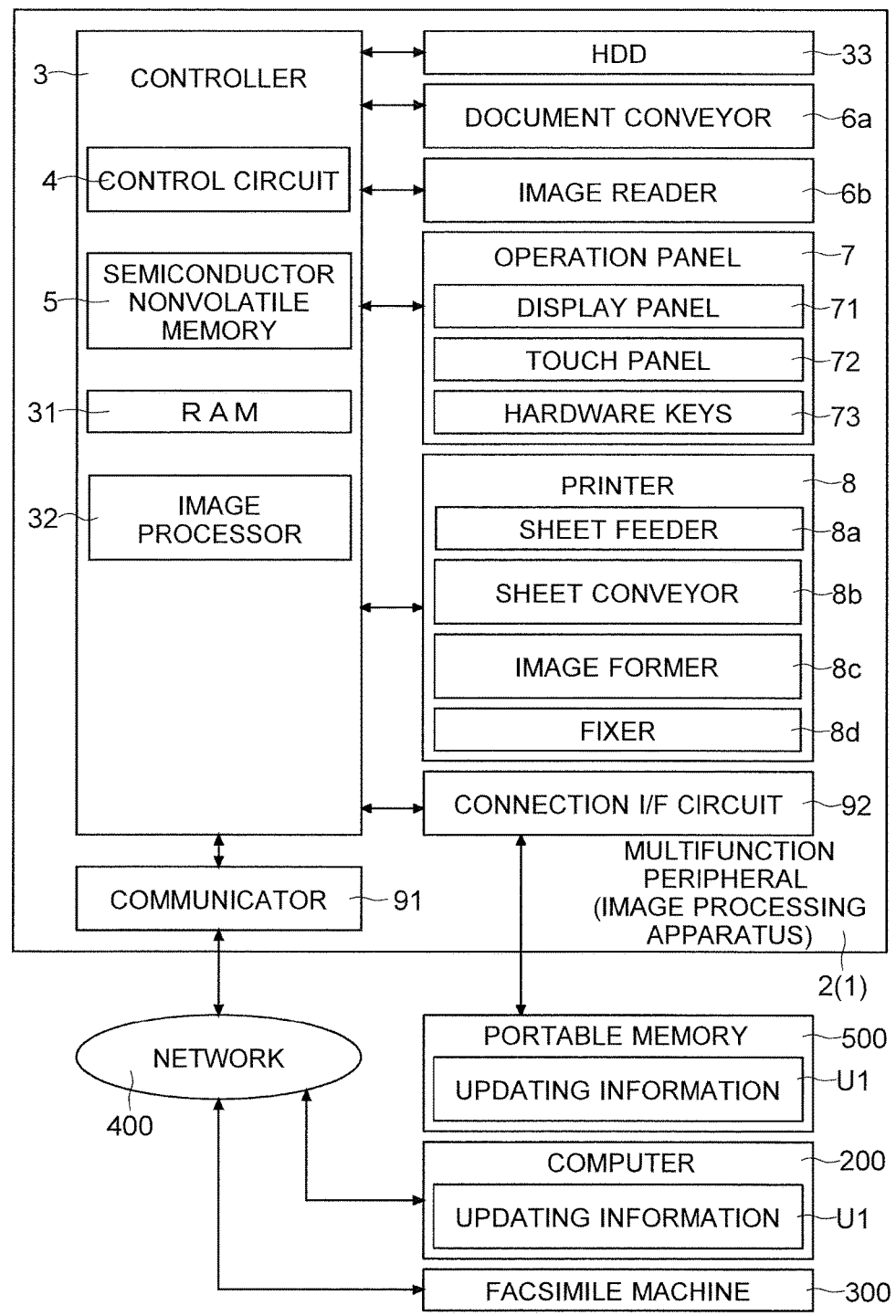
FIG. 1 is a diagram showing one example of a multifunction peripheral according to an embodiment.

With an image processing apparatus according to the present disclosure, it is possible to complete updating with whatever timing it may terminate abnormally. It is also possible to reduce backup information and thereby reduce the capacity of volatile memory.

Hereinafter, an embodiment of the present disclosure will be described with reference to FIGS. 1 to 8. As an image processing apparatus 1, a multifunction peripheral 2 will be taken as an example in the following description. It should however be noted that none of the features mentioned in terms of configuration, arrangement, etc. in the following description are meant to limit the scope of the disclosure; they are merely examples for the sake of description.

Outline of an Image Processing Apparatus: First, with reference to FIG. 1, an outline of the multifunction peripheral 2 according to the embodiment will be described. The multifunction peripheral 2 includes a controller 3. The controller 3 is a circuit board. The controller 3 controls different parts of the multifunction peripheral 2. The controller 3 includes a control circuit 4, a semiconductor nonvolatile memory 5 (corresponding to a nonvolatile memory), a RAM 31 (random-access memory), and an image processor 32. The control circuit 4 is a CPU. The control circuit 4 performs processing, control, and calculation. The control circuit 4 controls different parts of the multifunction peripheral 2.

The semiconductor nonvolatile memory 5 is, for example, a flash ROM of a NAND type; it may instead be a flash ROM of any other type. The control circuit 4 performs various kinds of calculation and processing. The semiconductor nonvolatile memory 5 and the RAM 31 store data and software (programs) related to control. The control circuit 4 controls the reading, writing, and erasure of data with respect to the semiconductor nonvolatile memory 5 based on software and data. The image processor 32 performs image processing on image data to generate image data to be used for print jobs and transmission jobs. The multifunction peripheral 2 performs image processing and executes jobs.

The multifunction peripheral 2 includes a HDD 33 (hard-disk drive). The HDD 33 is a large-capacity storage device. The HDD 33 is communicably connected to the controller 3. The control circuit 4 performs calculation and processing based on the software and control data stored in the semiconductor nonvolatile memory 5 and the HDD 33.

The multifunction peripheral 2 includes a document conveyor 6a and an image reader 6b. The controller 3 makes the document conveyor 6a convey a placed document. The document conveyor 6a conveys the document, one sheet after anther, toward a reading position (a feed-reading contact glass, unillustrated). The controller 3 makes the image reader 6b read the document. The image reader 6b reads a conveyed document or a document placed on a stationary-reading contact glass (unillustrated). The image reader 6b generates image data.

The multifunction peripheral 2 includes an operation panel 7. The operation panel 7 includes a display panel 71, a touch panel 72, and hardware keys 73. The display panel 71 displays setting screens related to printing and scanning as well as various messages. The touch panel 72 is provided for the display panel 71. The hardware keys 73 are keys to be operated, such as a Start key. The operation panel 7 accepts settings made by a user. The controller 3 recognizes settings made on the operation panel 7.

The multifunction peripheral 2 includes a printer 8. The printer 8 includes a sheet feeder 8a, a sheet conveyor 8b, an image former 8c, and a fixer 8d. During printing, the controller 3 makes the sheet feeder 8a feed a sheet. The controller 3 makes the sheet conveyor 8b convey the sheet. The controller 3 makes the image former 8c form a toner image based on image data. The controller 3 makes the image former 8c transfer the toner image to the conveyed sheet. The controller 3 makes the fixer 8d apply heat and pressure to the sheet having the toner image transferred to it. Thus, the toner image is fixed to the sheet. After the fixing, the sheet is discharged out of the apparatus.

The multifunction peripheral 2 includes a communicator 91. The controller 3 is connected to the communicator 91. The communicator 91 includes a connector for communication and a chip for communication control. The communicator 91 communicates with a computer 200 and a facsimile machine 300 across a network 400. The computer 200 is a PC or a server. The communicator 91 receives print data (image data and print settings). The image processor 32 performs image processing on the print data. The controller 3 makes the printer 8 print based on the processed image data (a printer function). The image processor 32 also generates image data to be transmitted. The communicator 91 transmits the generated image data to the computer 200 and the facsimile machine 300 (a transmission function).

The multifunction peripheral 2 includes a connection I/F circuit 92 (interface circuit). The controller 3 is connected to the connection I/F circuit 92. The connection I/F circuit 92 is a circuit for exchanging data with a portable memory 500. The connection I/F circuit 92 includes a connector (socket), a communication control circuit, and a memory. The portable memory 500 is, for example, a USB memory or a memory card. The controller 3 reads out data from the connected portable memory 500 via the connection I/F circuit 92. The controller 3 also writes in data to the connected portable memory 500 via the connection I/F circuit 92.

Semiconductor Nonvolatile Memory 5: Next, with reference to FIG. 2, one example of the semiconductor nonvolatile memory 5 according to the embodiment of the present disclosure will be described. The image processing apparatus 1 (multifunction peripheral 2) includes the control circuit 4 (CPU), the semiconductor nonvolatile memory 5, and the RAM 31. The control circuit 4 controls the reading-out of data from the semiconductor nonvolatile memory 5. The control circuit 4 controls the writing-in of data to the semiconductor nonvolatile memory 5.

Figure 2:
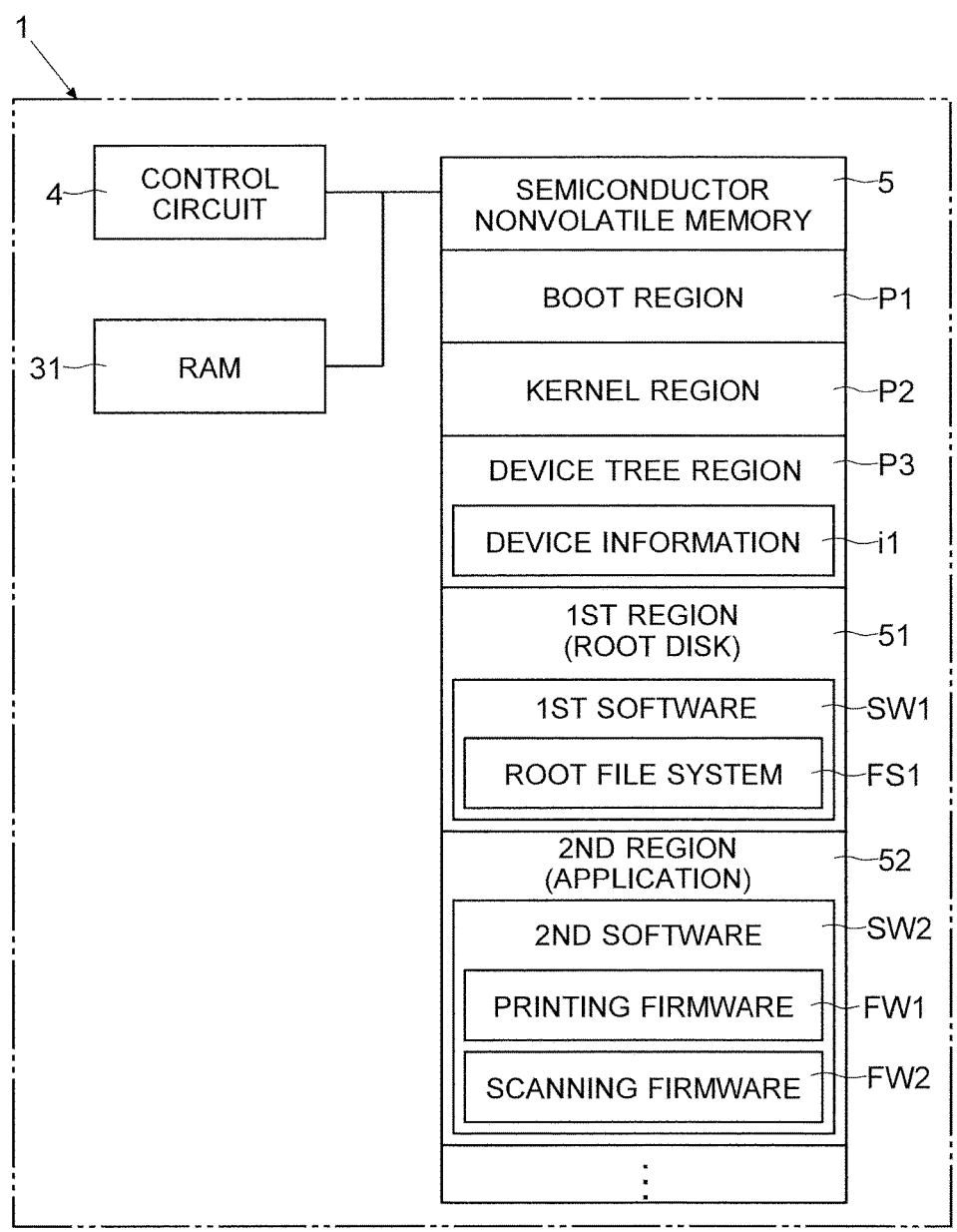
FIG. 2 is a diagram showing one example of a semiconductor nonvolatile memory according to the embodiment.

The storage region of the semiconductor nonvolatile memory 5 is previously divided into a plurality of regions (partitions). The sizes of these regions are determined previously. As shown in FIG. 2, the semiconductor nonvolatile memory 5 includes a boot region P1, a kernel region P2, a device tree region P3, a first region 51, and a second region 52.

The boot region P1 stores data, software (programs), and files for booting (starting-up). The boot region P1 stores, for example, a boot loader. The kernel region P2 stores data, software (programs), and files necessary to configure a kernel. The kernel region P2 stores, for example, a kernel image as well as software, data, and files for configuring the kernel.

The device tree region P3 stores information (device information i1) on different hardware elements of the multifunction peripheral 2. Relevant devices include, for example, the semiconductor nonvolatile memory 5, the RAM 31, a communication bus used within the multifunction peripheral 2, the communicator 91, and the connection I/F circuit 92. The device tree region P3 stores information on those devices. The control circuit 4 configures the drivers of those devices by using the device information i1 in the device tree region P3.

As further partitions, the first and second regions 51 and 52 are provided. The first region 51 stores previously determined first software SW1. The first region 51 may store any information other than the first software SW1; it may store, for example, status information on the multifunction peripheral 2 and version information on different pieces of software.

The software may include a plurality of pieces of software. The first software SW1 includes a program necessary for updating. The first software SW1 may also include data and files. Part or all of the first software SW1 is read out into the RAM 31. The first software SW1 makes the control circuit 4 perform processing. The first software SW1 is a set of information (the stored contents of the first region 51) for achieving the functions corresponding to the first software SW1.

The second region 52 stores previously determined second software SW2. Also the second region 52 may store any information other than the second software SW2. The second software SW2 may include a plurality of pieces of software. The second software SW2 may include related data and files. Part or all of the second software SW2 is read out into the RAM 31. The second software SW2 makes the control circuit 4 perform processing. The second software SW2 is a set of information (the stored contents of the second region 52) for achieving the functions corresponding to the second software SW2.

The first region 51 is a root disk region. In other words, the first region 51 is a partition where a root file system FS1 (root directory) is provided. The first software SW1 includes software related to the root file system FS1. The first region 51 (first software SW1) can include, for example, various command files.

The second region 52 (second software SW2) includes, for example, firmware for executing print jobs (printing firmware FW1) and firmware for executing document reading jobs (scanning firmware FW2). These firmware are included in the second software SW2. Thus, firmware used for jobs can be included in the second software SW2. The firmware included in the second software SW2 is not limited to those for printing and scanning; it can include, for example, firmware for the operation panel 7 related to the control of display on the display panel 71 and the control of the touch panel 72.

The first software SW1 is used for the updating (refreshing) of the semiconductor nonvolatile memory 5. The second software SW2 is not used for the updating of the semiconductor nonvolatile memory 5. The first software SW1 (first region 51) may include software that is not used for the updating of the semiconductor nonvolatile memory 5.

Updating information U1 (see FIGS. 1 and 6) comprises data and files for updating different regions of the nonvolatile memory. The updating information U1 is fed in to a data input unit of the image processing apparatus 1 (multifunction peripheral 2). The communicator 91 or the connection I/F circuit 92 can be used as the data input unit. In updating, based on the acquired updating information U1, the control circuit 4 rewrites the software in different regions. In updating, the control circuit 4 may also rewrite information other than software.

In a case where the communicator 91 is used, the control circuit 4 gets the updating information U1 downloaded from the computer 200 to the communicator 91. In a case where the connection I/F circuit 92 is used, the control circuit 4 reads out the updating information U1 stored in the portable memory 500 (USB memory) connected to the connection I/F circuit 92.

Without communication software for the communicator 91 or communication software for the connection I/F circuit 92, the updating of the semiconductor nonvolatile memory 5 cannot be performed. Communication software for the communicator 91 can be included, as the first software SW1, in the first region 51. For example, the first region 51 stores control firmware for the communicator 91 as the first software SW1. Communication software for the connection I/F circuit 92 can be included, as the first software SW1, in the first region 51. For example, the first region 51 stores control firmware for the connection I/F circuit 92 as the first software SW1.

On the other hand, the second software SW2 includes no software that is used for the updating of the semiconductor nonvolatile memory 5. Part of software that is not necessary for updating constitutes the second software SW2.

In the image processing apparatus 1, the sizes of the first and second regions 51 and 52 are equal. They do not have to be exactly equal. There may be a difference in size within a predetermined range. The sizes of the first and second regions 51 and 52 are each larger than the size of the first software SW1. The sizes of the first and second regions 51 and 52 are each larger than the size of the second software SW2.

To minimize the wasted free space, the sizes of the first and second software are made equal. Or the absolute value of the difference in size is made equal to or smaller than a previously determined permissible value. The permissible value is, for example, the size of the largest or smallest size among the pieces of software included in the second software SW2.

In addition, a first absolute value, which is the absolute value of the difference between the sizes of the first region 51 and the first software SW1, a second absolute value, which is the absolute value of the difference between the sizes of the first region 51 and the second software SW2, a third absolute value, which is the absolute value of the difference between the sizes of the second region 52 and the first software SW1, and a fourth absolute value, which is the absolute value of the difference between the sizes of the second region 52 and the second software SW2, may be made all equal to or smaller than permissible values. That is, the sizes of the first region 51, the second region 52, the first software SW1, and the second software SW2 may be set (adjusted) such that those absolute values are all equal to or smaller than permissible values.

Updating the Semiconductor Nonvolatile Memory 5: Next, with reference to

FIGS. 3 to 8, a description will be given of one example of the flow for updating the semiconductor nonvolatile memory 5 according to the embodiment. In FIGS. 4 to 8, dash-dot-dot-line arrows indicate reading-in (mounting) from the semiconductor nonvolatile memory 5 to the RAM 31. At start-up, the control circuit 4 reads the boot region P1, the kernel region P2, the device tree region P3, the first region 51, and the second region 52 in this order. The contents of those regions are read out into the RAM 31 (see FIG. 4). In FIGS. 4 to 8, broken-line arrows indicate copying (backing-up) of the regions (partitions, stored contents).

Figure 3:
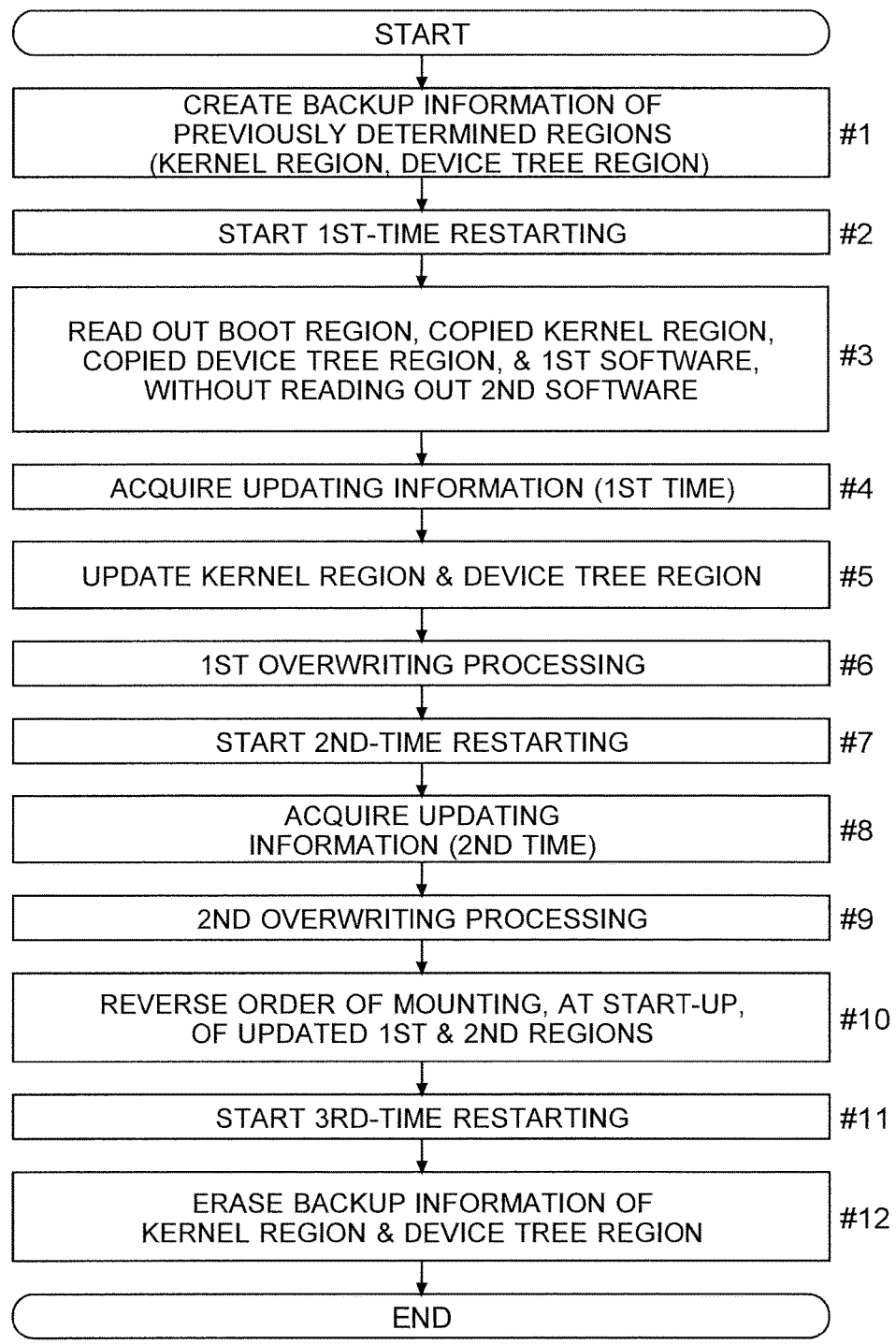
FIG. 3 is a flow chart showing one example of a flow for the updating of the semiconductor nonvolatile memory according to the embodiment.

The flow in FIG. 3 starts when a starting condition for the updating of the semiconductor nonvolatile memory 5 is satisfied. It is here assumed that the image processing apparatus 1 (multifunction peripheral 2) has already started up. Input of an updating request to the image processing apparatus 1 constitutes a starting condition. The operation panel 7 accepts an input operation for an updating request. Instead, the control circuit 4 (controller 3) may regard, as input of an updating request, connection of a portable memory 500 having updating information U1 stored in it to the connection I/F circuit 92.

When a starting condition for updating is satisfied, the control circuit 4 makes updating software (program) start to run. According to the updating software, the control circuit 4 performs the operations shown in FIG. 3 sequentially. The control circuit 4 acquires the updating software from the connection I/F circuit 92 and runs it. Instead, the updating software may be previously stored in the semiconductor nonvolatile memory 5. In that case, the control circuit 4 runs the updating software stored in the semiconductor nonvolatile memory 5.

At the start of updating, the control circuit 4 creates a copy of the contents of previously determined regions (step #1). In other words, the control circuit 4 stores, in the semiconductor nonvolatile memory, backup information B1 of previously determined regions 5.

Figure 4:
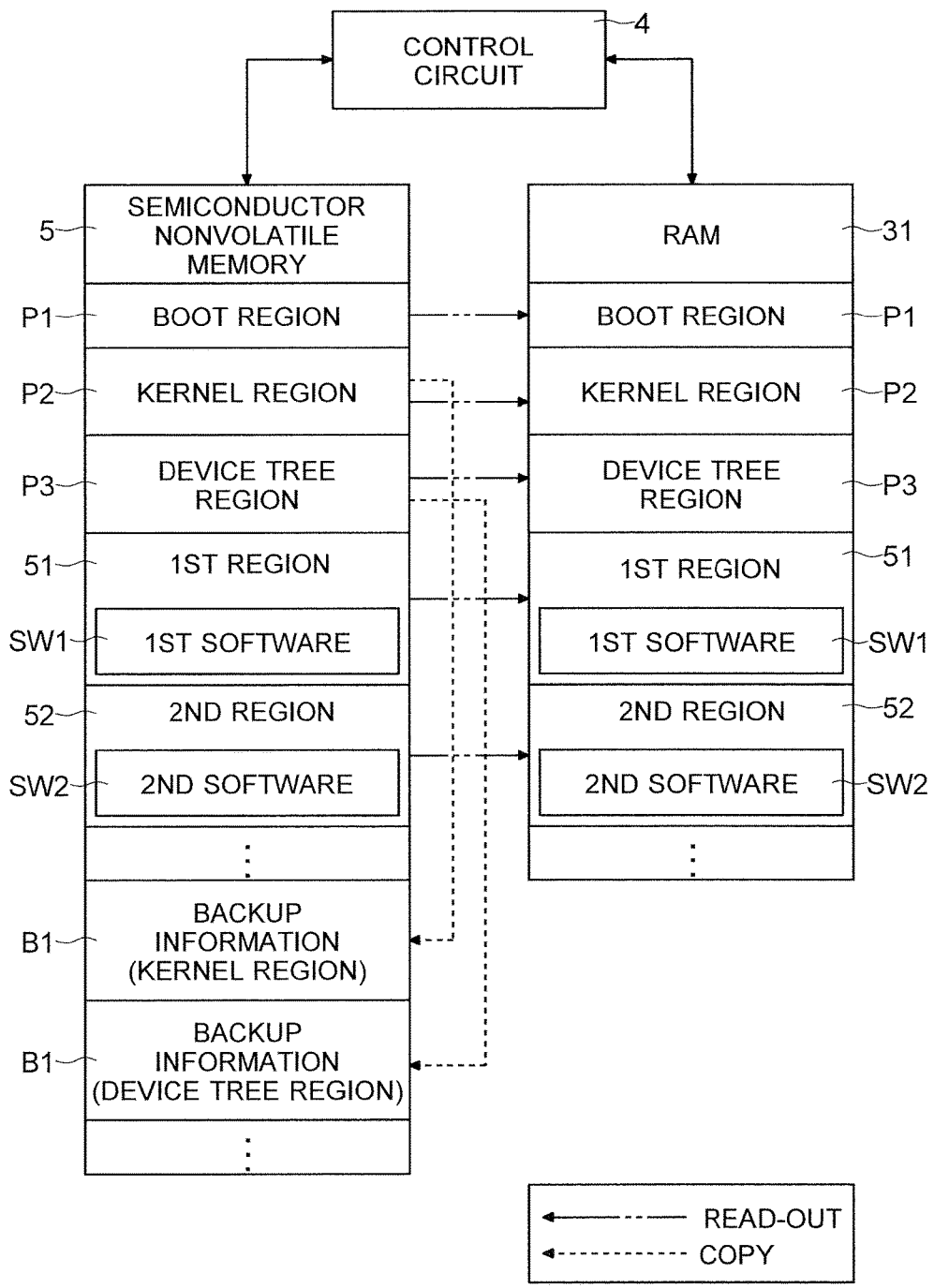
FIG. 4 is a diagram showing one example of a stage in preparation for the updating of the semiconductor nonvolatile memory according to the embodiment.

As shown in FIG. 4, the control circuit 4 creates backup information B1 of the stored contents of the kernel region P2 and the stored contents of the device tree region P3. A region (partition) for storing the backup information of those regions is previously secured. The sizes of the kernel region P2 and the device tree region P3 are smaller than those of the first and second regions 51 and 52. Thus, the backup information B1 of the kernel region P2 and the device tree region P3 does not strain the storage region of the semiconductor nonvolatile memory 5.

Figure 5:
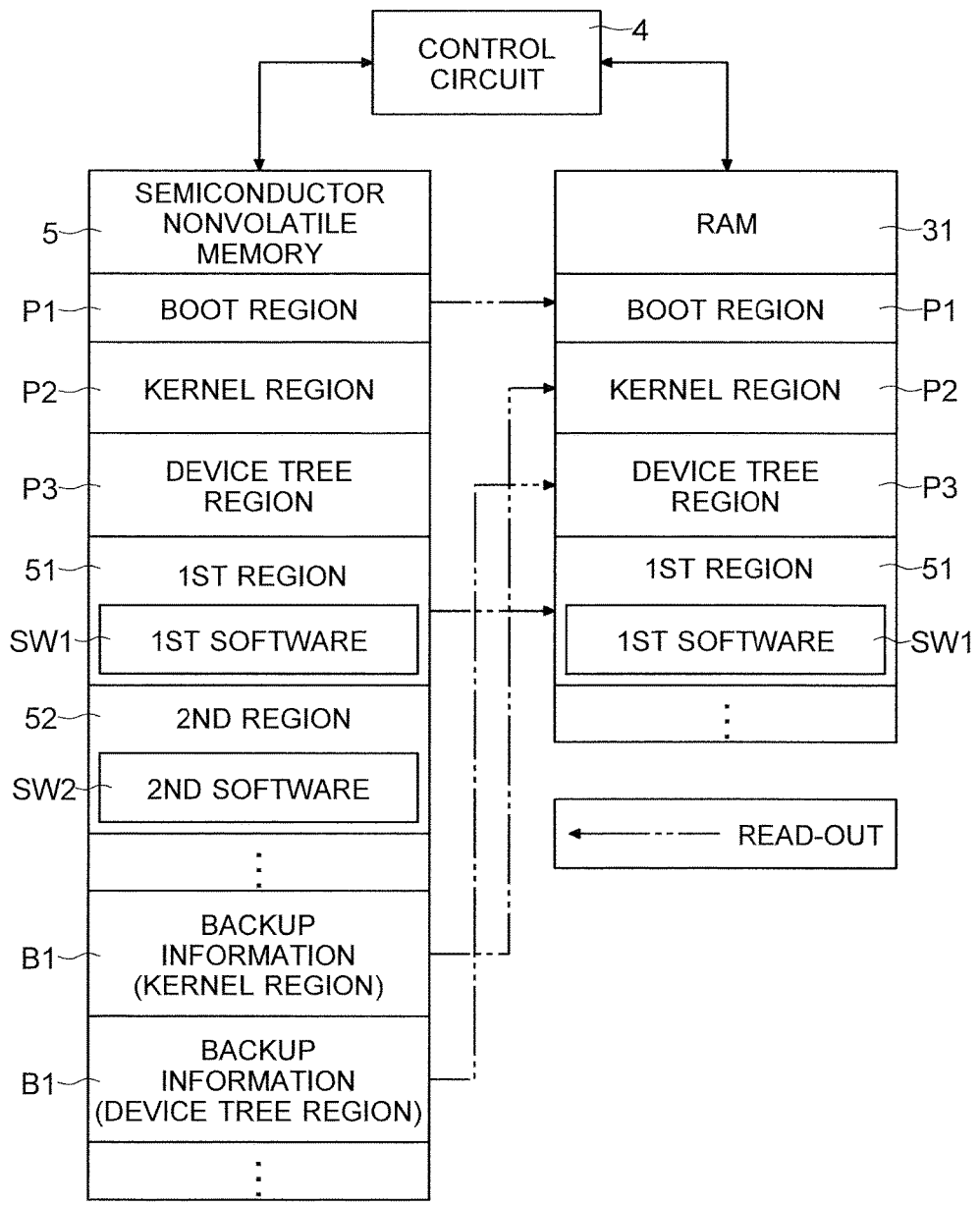
FIG. 5 is a diagram showing one example of a stage of first-time restarting during the updating of the semiconductor nonvolatile memory according to the embodiment.

After step #1 is complete, the control circuit 4 performs first-time restarting (step #2). In the restarting, the RAM 31 is reset (what is stored in the RAM 31 is erased; the same applies to similar utterances). With reference to FIG. 5, the operations involved in the first-time restarting will be described. When the restarting is performed, the control circuit 4 reads out the contents of the boot region P1 into the RAM 31 (step #3). Next, the control circuit 4 reads out the contents of the copied kernel region P2 into the RAM 31 (step #3). That is, the control circuit 4 reads out the backup information B1 of the kernel region P2. Next, the control circuit 4 reads out the contents of the copied device tree region P3 into the RAM 31 (step #3). That is, the control circuit 4 reads out the backup information B1 of the device tree region P3. Thus, for the kernel region P2 and the device tree region P3, the backup information B1 is mounted. The control circuit 4 does not mount the original kernel region P2 or device tree region P3.

Subsequently, the control circuit 4 reads out the contents (first software SW1) of the first region 51 into the RAM 31 (step #3). On the other hand, the control circuit 4 does not read out the contents (second software SW2) of the second region 52 because they are not necessary for updating (step #3). In other words, at start-up based on the first-time restarting, the control circuit 4 does not mount the second region 52.

Subsequently, the control circuit 4 acquires updating information U1 (step #4; first-time acquisition of updating information U1). The control circuit 4 may make the communicator 91 acquire updating information U1. In that case, the communicator 91 downloads updating information U1. Instead, the control circuit 4 may make the connection I/F circuit 92 acquire updating information U1. In that case, the connection I/F circuit 92 reads out updating information U1 from the portable memory 500.

Figure 6:
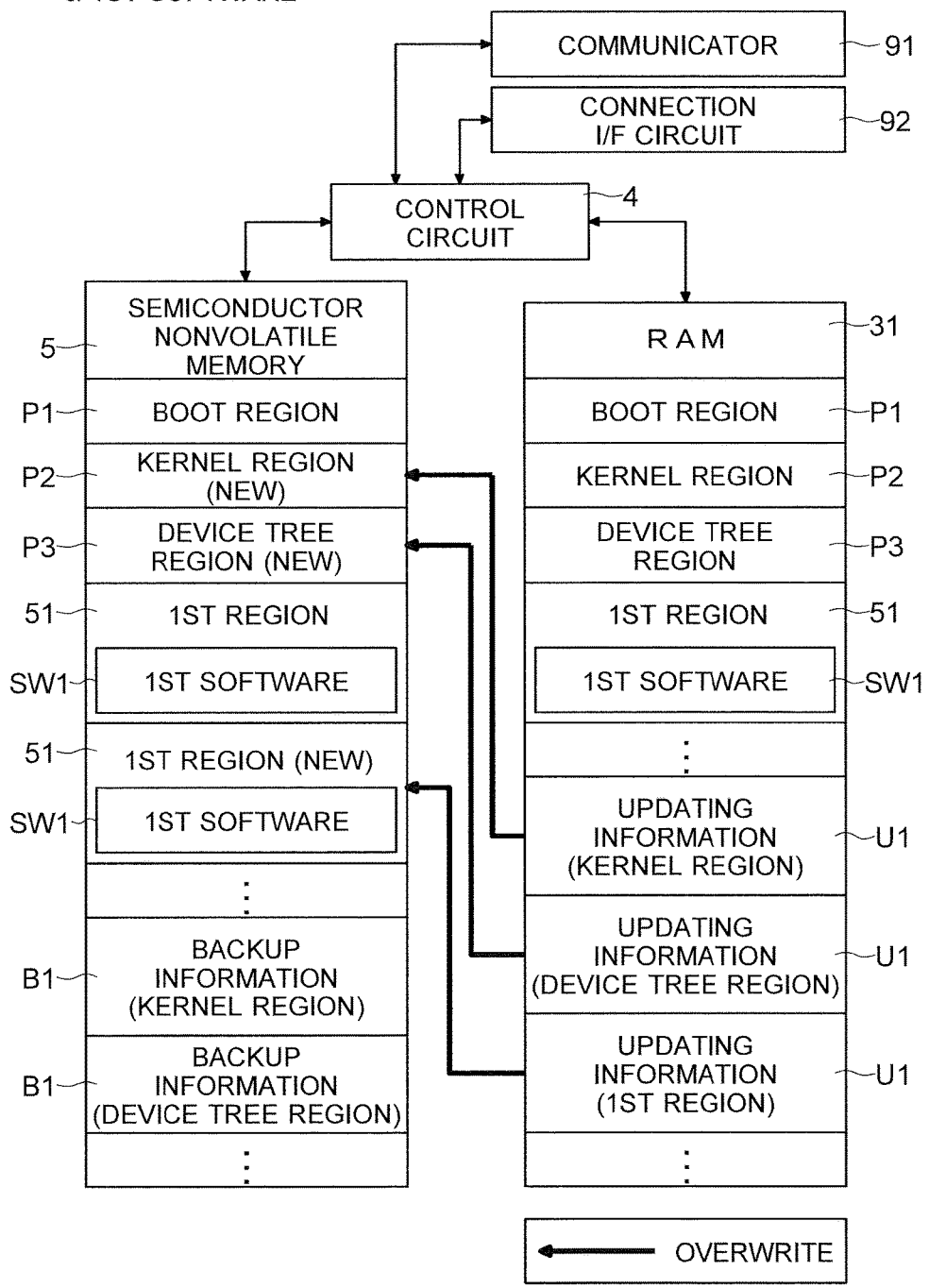
FIG. 6 is a diagram showing one example of the updating of a first region in the semiconductor nonvolatile memory according to the embodiment.

In the first-time acquisition of the updating information U1, the control circuit 4 acquires the updating information U1 of the kernel region P2, the device tree region P3, and the first region 51. For example, as shown in FIG. 6, the acquired updating information U1 is stored in the RAM 31. Based on the acquired updating information U1, the control circuit 4 updates the stored contents of the kernel region P2 and the stored contents of the device tree region P3 (step #5).

Specifically, the control circuit 4 gets the original kernel region P2 overwritten with the updating information U1 corresponding to the kernel region P2. The control circuit 4 also gets the original device tree region P3 overwritten with the updating information U1 corresponding to the device tree region P3 (see FIG. 6).

Furthermore, the control circuit 4 makes the nonvolatile memory perform first overwriting processing (step #6). The first overwriting processing is processing whereby the second region 52 is overwritten with the first software SW1. That is, the control circuit 4 makes the second region 52 a new first region 51. Specifically, the control circuit 4 gets the updating information U1 of the first region 51 (first software SW1) written in to the second region 52. The sizes of the first and second regions 51 and 52 are equal, or approximately equal; thus, the entire first software SW1 can be stored in the second region 52. The size of the second region 52 is previously set at a size that permits the first software SW1 to be stored there.

As shown in FIG. 6, the control circuit 4 overwrites the second region 52 with the updating information U1 corresponding to the contents (first software SW1) to be stored in the first region 51. Thus, the first software SW1 is stored in two regions temporarily. From the start to the end of step #6, no access is made to the original (old) first region 51. Thus, even if updating terminates abnormally in the middle of step #6, the original first software SW1 is retained. An abnormal termination causes no damage to the original first software SW1. For example, when the first overwriting is started, the control circuit 4 gets the fact that the first overwriting processing has been started stored as a first flag in the semiconductor nonvolatile memory 5. Instead, when updating terminates abnormally during the first overwriting processing, the control circuit 4 may get the fact that an abnormal termination has occurred during the first overwriting processing stored as a first flag in the semiconductor nonvolatile memory 5. When the first overwriting processing is complete, the control circuit 4 erases the first flag. In restarting, the control circuit 4 checks whether a first flag is present or absent. When the first flag is stored, the control circuit 4 mounts the original first region 51, and performs the first overwriting processing all over again (performs steps #2 through #6 all over again). When the first overwriting processing is complete, the control circuit 4 erases the first flag. Thus, at start-up for the restarting of updating, the control circuit 4 can perform updating without problem based on the original first software SW1.

Figure 7:
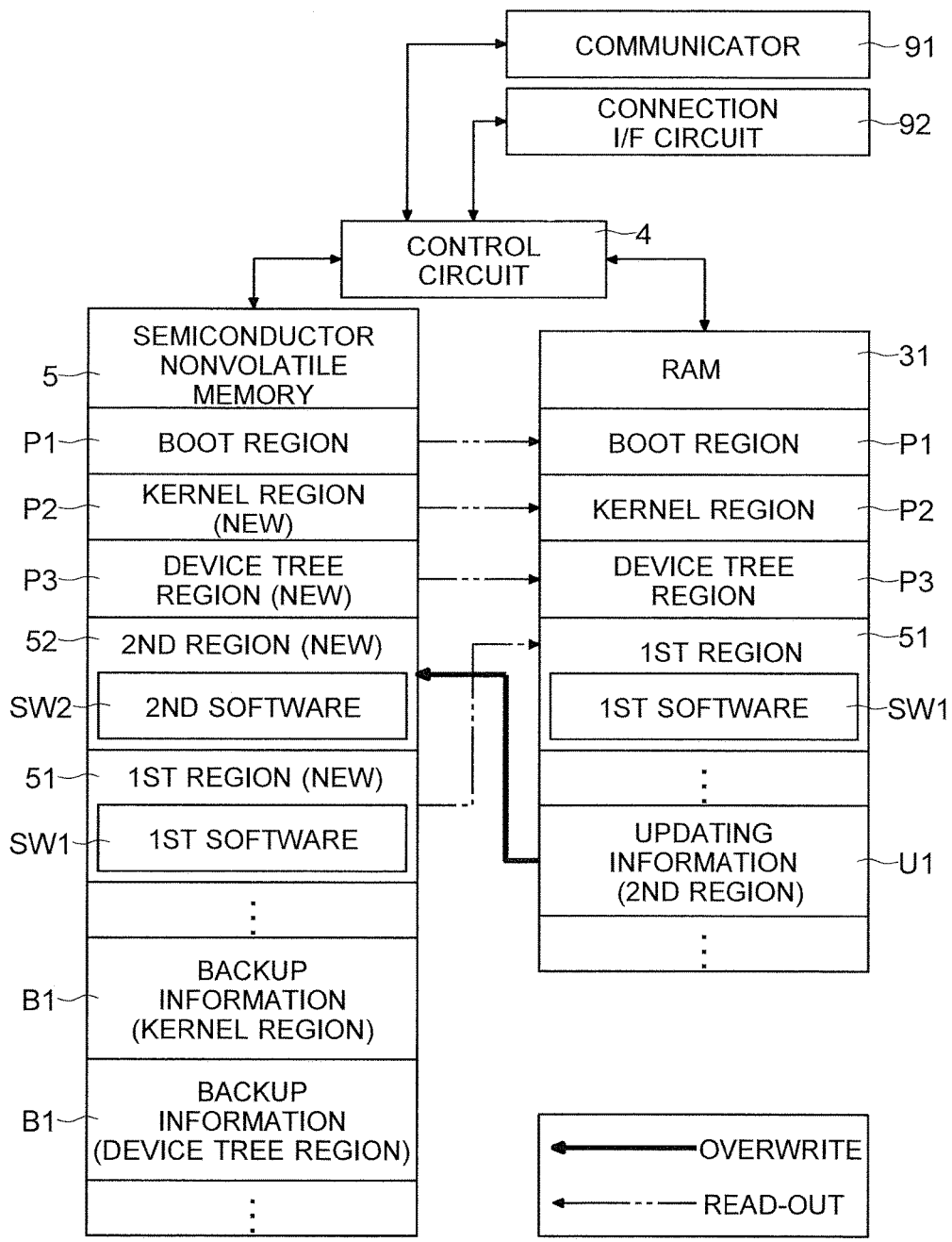
FIG. 7 is a diagram showing one example of the updating of a second region in the semiconductor nonvolatile memory according to the embodiment.

After step #6 is complete, the control circuit 4 performs second-time restarting (step #7). As shown in FIG. 7, the control circuit 4 reads out the contents of the boot region P1 into the RAM 31 (step #7). Next, the control circuit 4 reads out the contents of the updated kernel region P2 into the RAM 31 (step #7). Next, the control circuit 4 reads out the contents of the updated device tree region P3 into the RAM 31 (step #7). For the kernel region P2 and the device tree region P3, the updated regions are mounted. The control circuit 4 does not mount the copied (backed-up) kernel region P2 or device tree region P3.

Subsequently, the control circuit 4 reads out the contents (first software SW1) of the new first region 51 (old second region 52) into the RAM 31 (step #7). At this stage, the second software SW2 is not present in the semiconductor nonvolatile memory 5. Accordingly, in the second-time restarting, the control circuit 4 does not read out the second software SW2 into the RAM 31. Also at start-up based on the second-time restarting, the control circuit 4 does not mount the second software SW2 stored in the second region 52.

The control circuit 4 acquires updating information U1 (step #8; second-time acquisition of updating information U1). As shown in FIG. 7, the control circuit 4 makes the communicator 91 or the connection I/F circuit 92 acquire updating information U1. In the second-time acquisition of updating information U1, the control circuit 4 acquires the updating information U1 (second software SW2) of the second region 52. For example, as shown in FIG. 7, the acquired second software SW2 is stored in the RAM 31.

Based on the acquired updating information U1, the control circuit 4 makes the nonvolatile memory perform second overwriting processing (step #9). The second overwriting processing is processing whereby the old first region 51 is overwritten with the second software SW2. The old first region 51 denotes the region in which the first software SW1 has been stored since before the start of updating. In other words, the old first region 51 denotes the region where the pre-updating first software SW1 is stored. The control circuit 4 makes the old first region 51 a new second region 52. Now, the updating of the semiconductor nonvolatile memory 5 is complete.

Specifically, the control circuit 4 writes in the updating information U1 of the second software SW2 to the old first region 51. The sizes of the first and second regions 51 and 52 are equal or approximately equal. Thus, the entire second software SW2 can be stored in the old first region 51. The size of the first region 51 is previously set at a size that permits the second software SW2 to be stored there.

Even if updating terminates abnormally in the middle of the second overwriting processing (step #9), the storing of the new first software SW1 has been complete. There is no damage at all to the first software SW1 in the new first region 51. For example, when the second overwriting is started, the control circuit 4 gets the fact that the second overwriting processing has been started stored as a second flag in the semiconductor nonvolatile memory 5. Instead, when updating terminates abnormally in the middle of the second overwriting processing, the control circuit 4 may get the fact that an abnormal termination has occurred during the second overwriting processing stored as a second flag in the semiconductor nonvolatile memory 5. When the second overwriting processing is complete, the control circuit 4 erases the second flag. In restarting, the control circuit 4 checks whether a second flag is present or absent. When the second flag is stored, the control circuit 4 mounts the new first region 51, and performs the second overwriting processing all over again (performs steps #7 through #9 all over again). When the second overwriting processing is complete, the control circuit 4 erases the second flag. Based on the first software SW1 in the new first region 51, the updating that was interrupted in the middle of the second overwriting processing can be restarted without problem.

Here, by updating, the order of the first and second regions 51 and 52 (the order of partitions) is reversed. The control circuit 4 reverses the order of mounting, at start-up, of the new (post-updating) first region 51 and the new (post-updating) second region 52 after updating compared with before updating (step #10).

The semiconductor nonvolatile memory 5 stores an order definition file in which the order of mounting of partitions is defined. The order definition file can be stored in the boot region P1, the kernel region P2, the device tree region P3, or any other region.

Here, the new first region 51 is the pre-updating second region 52. The new second region 52 is the pre-updating first region 51. When the order of mounting of regions (partitions) is wrong, the image processing apparatus 1 may not start up normally. Thus, the control circuit 4 adjusts the order of mounting of the new first and second regions 51 and 52. The control circuit 4 modifies the contents of the order definition file. The control circuit 4 reverses the order of mounting of the new first and second regions 51 and 52.

Figure 8:
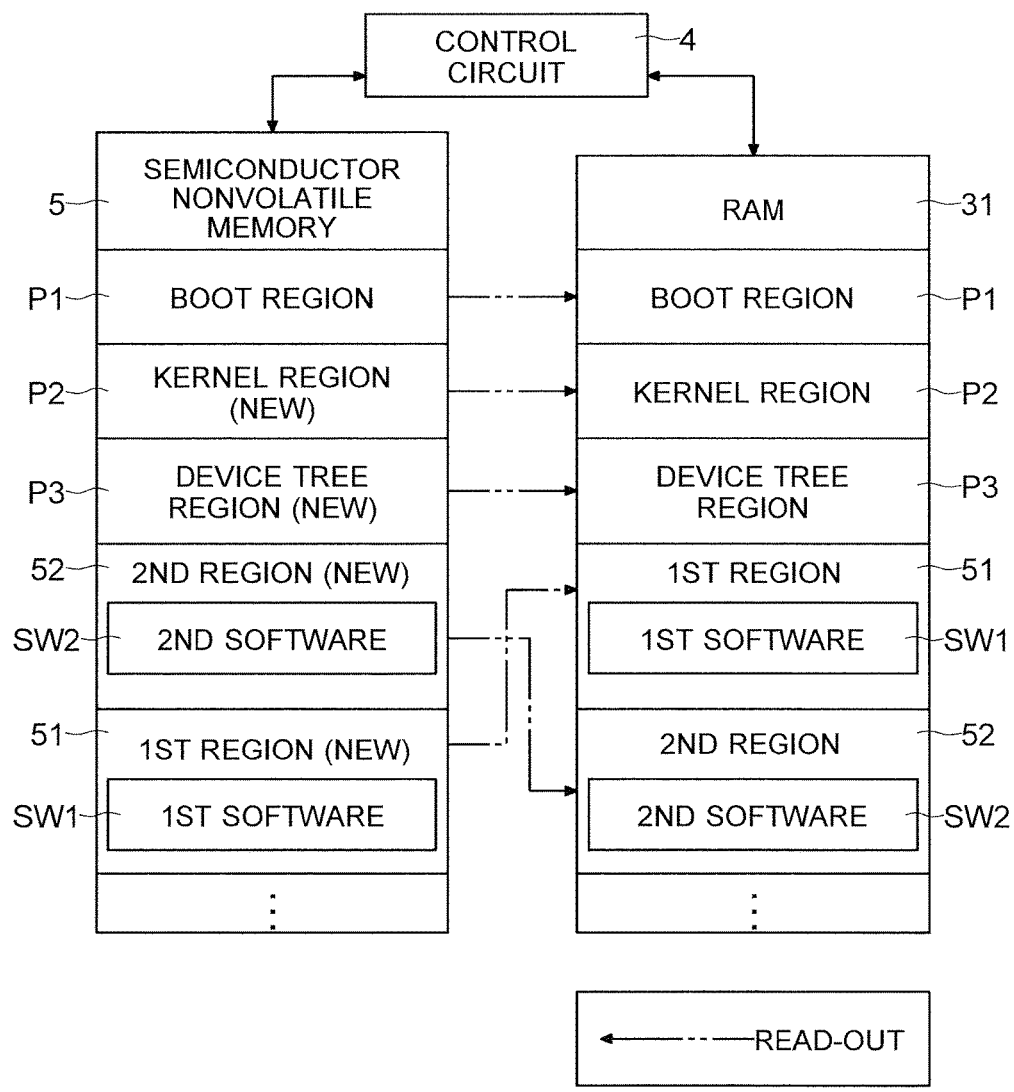
FIG. 8 is a diagram showing one example of normal starting-up after completion of the updating of the semiconductor nonvolatile memory according to the embodiment.

After step #10 is complete, the control circuit 4 performs third-time restarting (step #11). In the restarting, what is stored in the RAM 31 is reset. As shown in FIG. 8, the control circuit 4 reads out the contents of the boot region P1 into the RAM 31. Next, the control circuit 4 reads out the contents of the updated kernel region P2 into the RAM 31. Next, the control circuit 4 reads out the contents of the updated device tree region P3 into the RAM 31. Next, the control circuit 4 reads out the contents (first software SW1) of the new first region 51 into the RAM 31. Subsequently, the control circuit 4 reads out the contents (second software SW2) of the new second region 52 into the RAM 31.

As shown in FIG. 8, the control circuit 4 erases the backup information B1 of the kernel region P2 and the device tree region P3 (step #12). With this, the flow ends (END).

As described above, the image processing apparatus 1 according to the embodiment includes a nonvolatile memory, a control circuit 4, and a data input unit. The nonvolatile memory is provided with a plurality of regions by partitioning. The nonvolatile memory includes a first region 51 which is one of the regions and which stores previously determined first software SW1. The nonvolatile memory includes a second region 52 which is one of the regions and which stores previously determined second software SW2. The control circuit 4 controls the nonvolatile memory. The data input unit acquires updating information U1 of the nonvolatile memory. The first software SW1 is used for the updating of the nonvolatile memory. The second software SW2 is not used for the updating of the nonvolatile memory. When a previously determined starting condition for updating is satisfied, the control circuit 4, based on the updating information U1 acquired by the data input unit, overwrites the second region 52 with the first software SW1. The control circuit 4 makes the nonvolatile memory perform first overwriting processing whereby the second region 52 is made a new first region 51. After the first overwriting processing is complete, the control circuit 4, based on the updating information U1 acquired by the data input unit, overwrites the old first region 51 with the second software SW2. The control circuit 4 makes the nonvolatile memory perform second overwriting processing whereby the old first region 51 is made a new second region 52.

In this way, during updating (during any overwriting processing), the complete first software SW1 can be retained in either the first region 51 or the second region 52. Thus, even if updating terminates abnormally during the first overwriting processing, by use of the first software SW1 in the pre-updating first region 51, updating processing (performing it all over again) for the image processing apparatus 1 can be completed. With whatever timing updating may terminate abnormally, the image processing apparatus 1 operates without problem.

The first region 51 stores the first software used for updating. Conventionally, the first software SW1 is copied before updating. That is, conventionally, a large-capacity nonvolatile memory has to be adopted to enable storage of backup information of the first software SW1. However, no backup information (region) of the first software SW1 has to be created any longer. It is thus possible to reduce the capacity of the nonvolatile memory compared with the conventional norm. It is possible to adopt a smaller-capacity, and hence more inexpensive, nonvolatile memory than ever.

The former second region 52 becomes a new first region 51. On the other hand, the former first region 51 becomes a new second region 52. There may be a case where the order of making partitions ready to use (mounting them) at start-up is prescribed. Thus, interchanging the partitions that store the first and second software SW1 and SW2 may make the image processing apparatus 1 unable to start up. Accordingly, when the second overwriting processing is complete, the control circuit 4 reverses the order of mounting, at start-up, of the first and second regions 51 and 52 after updating compared with before updating. Thus, even when the partitions that store the first and second software SW1 and SW2 are interchanged, the image processing apparatus 1 can start up.

The sizes of the first and second regions 51 and 52 are equal. Thus, the sizes of the first and second regions 51 and 52 are sizes that permit the first software SW1 to be stored there. The sizes of the first and second regions 51 and 52 are also sizes that permit the second software SW2 to be stored there.

In a case where the difference between the sizes of the first and second software SW1 and SW2 is large, the sizes of the first and second regions 51 and 52 have to be larger than the size of whichever software is larger. In the region (partition) that stores the smaller total size of software, a large region is left free. The free region is unused and wasted. Accordingly, the sizes of the first and second software SW1 and SW2 are equal, or the difference in size is within a previously determined permissible range. Thus, to the sizes of the first and second regions 51 and 52, the sizes of the first and second software SW1 and SW2 are adapted. It is possible to minimize the free regions in those regions. It is possible to reduce wasted regions in those regions. It is thus possible to adopt a nonvolatile memory with a smaller capacity than ever.

The first region 51 is a root disk region where a root file system FS1 is provided, and the second region 52 is an application region where firmware for executing print jobs is stored. That is, the first software SW1 includes software related to the root file system FS1. The second software SW2 includes firmware for executing print jobs. Thus, software necessary for updating can be included in the first region 51, and the software necessary for updating can be mounted at least in the first region 51. On the other hand, software necessary for executing print jobs but not used for updating can be included in the second software SW2.

The present disclosure can be grasped as a control method for an image processing apparatus 1. According to the control method, by partitioning, a plurality of region is provided in a nonvolatile memory; in a first region 51, which is one of the regions, previously determined first software SW1 is stored; in a second region 52, which is one of the regions, previously determined second software SW2 is stored; updating information U1 of the nonvolatile memory is acquired; and the first software SW1 is used for the updating of the nonvolatile memory. The second software SW2 is not used for the updating of the nonvolatile memory. When a previously determined starting condition for updating is satisfied, based on the updating information U1, first overwriting processing is performed whereby the second region 52 is overwritten with the first software SW1 and the second region 52 is made a new first region 51. After the first overwriting processing is complete, based on the updating information U1, second overwriting processing is performed whereby the old first region 51 is overwritten with the second software SW2 and the old first region 51 is made a new second region 52.

What is claimed is:

1. An image processing apparatus comprising:
a nonvolatile memory provided with a plurality of regions by partitioning, the nonvolatile memory including
a first region which is one of the regions and which stores previously determined first software and
a second region which is one of the regions and which stores previously determined second software;
a control circuit which controls the nonvolatile memory;
a data input unit which acquires updating information of the nonvolatile memory: and
a RAM into which contents of the regions are read out, wherein
the first software is used for updating of the nonvolatile memory,
the second software is not used for the updating of the nonvolatile memory,
the nonvolatile memory includes a boot region, a kernel region, a device tree region, the first region, and the second region,
when a previously determined starting condition for the updating is satisfied, the control circuit stores, in the nonvolatile memory, backup information of stored contents of the kernel region and stored contents of the device tree region,
performs first-time restarting after storing of the backup information,
acquires, via the data input unit, the updating information of the kernel region, the device tree region, and the first region after the first-time restarting, and
makes the nonvolatile memory update the stored contents of the kernel region and the device tree region based on the acquired updating information, and
after the updating, the control circuit makes the nonvolatile memory perform first overwriting processing whereby, based on the updating information acquired by the data input unit, the second region is overwritten with the first software and the second region is made a new first region, and
after the first overwriting processing is complete, the control circuit makes the nonvolatile memory perform second overwriting processing whereby, based on the updating information acquired by the data input unit, an old first region is overwritten with the second software and the old first region is made a new second region.

2. The image processing apparatus according to claim 1, wherein
when the second overwriting processing is complete, the control circuit reverses an order of mounting, at start-up, of the new first region and the new second region after the updating compared with before the updating.

3. The image processing apparatus according to claim 1, wherein
sizes of the first and second regions are equal.

4. The image processing apparatus according to claim 1, wherein
the first region is a root disk region where a root file system is provided, and
the second region is an application region where firmware for executing a print job is stored.

5. The image processing apparatus according to claim 1, wherein
after the first overwriting processing, the control circuit performs second-time restarting,
gets contents of the new first region read out into the RAM after the second-time restarting,
acquires, via the data input unit, the updating information of the second region, and
makes the nonvolatile memory perform the second overwriting processing based on the acquired updating information.

6. The image processing apparatus according to claim 5, wherein after the second-time restarting, the control circuit performs third-time restarting, and
   erases the backup information of the kernel region and the device tree region.

7. A method of controlling an image processing apparatus, comprising:
   providing a plurality of regions in a nonvolatile memory by partitioning;
   storing previously determined first software in a first region which is one of the regions;
   storing previously determined second software in a second region which is one of the regions;
   acquiring updating information of the nonvolatile memory;
   reading out contents of the regions into a RAM;
   using the first software for the updating of the nonvolatile memory;
   not using the second software for the updating of the nonvolatile memory;
   the nonvolatile memory including a boot region, a kernel region, a device tree region, the first region, and the second region;
   when a previously determined starting condition for the updating is satisfied,
      storing, in the nonvolatile memory, backup information of stored contents of the kernel region and stored contents of the device tree region,
      performing first-time restarting after storing of the backup information,
      acquiring the updating information of the kernel region, the device tree region, and the first region after the first-time restarting, and
      updating the stored contents of the kernel region and the device tree region based on the acquired updating information, and
   after the updating, performing first overwriting processing whereby, based on the updating information, the second region is overwritten with the first software and the second region is made a new first region; and
   after the first overwriting processing is complete, performing second overwriting processing whereby, based on the updating information, an old first region is overwritten with the second software and the old first region is made a new second region.

* * * * *